US012734609B2

(12) United States Patent
Ikagawa

(10) Patent No.: US 12,734,609 B2
(45) Date of Patent: Sep. 15, 2026

(54) JOINING APPARATUS

(71) Applicant: TAZMO CO., LTD., Okayama (JP)

(72) Inventor: Yoshinori Ikagawa, Okayama (JP)

(73) Assignee: TAZMO CO., LTD., Okayama (JP)

( * ) Notice: Subject to any disclaimer, the term of this patent is extended or adjusted under 35 U.S.C. 154(b) by 697 days.

(21) Appl. No.: 18/035,133

(22) PCT Filed: Sep. 6, 2021

(86) PCT No.: PCT/JP2021/032690
§ 371 (c)(1),
(2) Date: May 3, 2023

(87) PCT Pub. No.: WO2022/102228
PCT Pub. Date: May 19, 2022

(65) Prior Publication Data

US 2024/0009769 A1 Jan. 11, 2024

(30) Foreign Application Priority Data

Nov. 13, 2020 (JP) ................................ 2020-189436

(51) Int. Cl.
*B23K 26/21* (2014.01)
*B23K 20/02* (2006.01)
(Continued)

(52) U.S. Cl.
CPC ............ *B23K 26/21* (2015.10); *B23K 20/021* (2013.01); *B23K 37/0461* (2013.01); *B23K 2103/56* (2018.08)

(58) Field of Classification Search
CPC .............. B23K 20/021; B23K 2101/40; B23K 2103/56; B23K 26/1224; B23K 26/21;
(Continued)

(56) References Cited

U.S. PATENT DOCUMENTS

2005/0205533 A1* 9/2005 Reis ....................... B23K 26/60 219/121.63
2011/0309057 A1* 12/2011 Lin ....................... B23K 26/10 219/121.63
(Continued)

FOREIGN PATENT DOCUMENTS

CN 210223961 U 3/2020
JP H11-220141 A 8/1999
(Continued)

OTHER PUBLICATIONS

International Search Report for corresponding Application No. PCT/JP2021/032690, mailed Nov. 16, 2021.

*Primary Examiner* — Steven W Crabb
*Assistant Examiner* — Ket D Dang
(74) *Attorney, Agent, or Firm* — Renner, Otto, Boisselle & Sklar, LLP

(57) ABSTRACT

A joining apparatus includes a table, a pressurizing mechanism, a laser light source that emits laser light, and a controller. The table has permeability to the laser light. Two joining targets are to be placed on the table while a first metal layer and a second metal layer face each other. The pressurizing mechanism includes a diaphragm, and is capable of applying pressure to a back surface of the joining target using the diaphragm from an opposite side to the table. The controller brings the first metal layer and the second metal layer into contact with each other by applying pressure to the back surface of the joining target while the two joining targets are placed on the table, and while maintaining the resultant state, applies the laser light to a place of contact between the first metal layer and the second metal layer through the table.

7 Claims, 5 Drawing Sheets

(51) Int. Cl.
*B23K 37/04* (2006.01)
*B23K 103/00* (2006.01)

(58) Field of Classification Search
CPC .. B23K 26/324; B23K 26/70; B23K 37/0435; B23K 37/0461; B23K 20/02; B23K 2103/18; B23K 26/0006; B23K 26/20; B23K 26/32; B81C 2203/035; B81C 99/002
USPC ..................................................... 219/121.63
See application file for complete search history.

(56) References Cited

U.S. PATENT DOCUMENTS

| | | | | |
|---|---|---|---|---|
| 2015/0249026 | A1* | 9/2015 | Tsuno | C23C 14/3407 156/151 |
| 2015/0352672 | A1* | 12/2015 | Kinoshita | B23K 26/34 219/121.64 |
| 2017/0221856 | A1 | 8/2017 | Yamauchi | |
| 2017/0345690 | A1 | 11/2017 | Linder | |

FOREIGN PATENT DOCUMENTS

| | | | |
|---|---|---|---|
| JP | 2004-343042 | A | 12/2004 |
| JP | 2011-200933 | A | 10/2011 |
| JP | 2014-063963 | A | 4/2014 |
| JP | 2018-506841 | A | 3/2018 |
| WO | 2016/060274 | A1 | 4/2016 |

* cited by examiner

JOINING APPARATUS

TECHNICAL FIELD

The present invention relates to a joining technique using laser light.

BACKGROUND ART

One of existing techniques of manufacturing semiconductor devices (such as MEMSs) is a technique of joining two wafers to each other utilizing eutectic reaction between two types of metals. More specifically, according to this technique, a metal layer containing one of two types of metals to generate eutectic reaction as a major constituent and a metal layer containing the other metal as a major constituent are formed on respective joint surfaces of two wafers, and the two wafers are joined to each other utilizing eutectic reaction resulting from contact between the metal layers and heating of the metal layers. As an example, this technique is used for sealing a sensor (such as a gyroscope sensor or a biosensor) or a waveguide in a device.

According to such a joining technique utilizing eutectic reaction, a place of contact between two metal layers is required to be heated to a temperature at which eutectic reaction is generated while these metal layers contact each other without space therebetween. In this regard, what has conventionally been done is to heat two wafers entirely together with a sensor, etc. to be sealed while these two wafers are sandwiched to be pressurized (see Patent Literature 1, for example).

CITATION LIST

Patent Literatures

Patent literature 1: Japanese published unexamined patent application No. 11-220141 (1999)

Patent Literature 2: Chinese published utility model registration No. 210223961

SUMMARY OF INVENTION

Technical Problem

According to the above-described conventional joining technique, however, heating even a sensor to be sealed causes a risk of damaging the sensor with heat. This imposes limitation on a sensor that can be sealed in a device using this technique to a sensor having high heat resistance.

In response to this, according to a technique recently suggested, heat is applied locally to a place of contact between two metal layers as a target using laser light (see Patent Literature 2). More specifically, according to this technique, two upper and lower wafers placed on a joining stage are pressurized with a quartz plate (specifically, the two wafers are sandwiched between the joining stage and the quartz plate to be pressurized). In this state, laser light is applied through the quartz plate to a place of contact between two metal layers, thereby generating eutectic reaction at the contact place.

According to this joining technique using laser light, as the place of contact between the two metal layers is heated locally, thermal influence on a sensor is reduced. As a result, it becomes possible to seal a sensor with low heat resistance in a device. Furthermore, as the place of contact between the two metal layers can be heated intensively with laser light, a temperature at the contact place can be increased rapidly to a temperature at which eutectic reaction is generated. As a result, it becomes possible to shorten time required for a joining process. The above-described joining technique using laser light is effective not only in joining utilizing eutectic reaction (eutectic bonding) but also in various joining types requiring local heating such as solder joining and weld joining.

On the other hand, if two wafers are sandwiched between two pressing planes (a surface of a joining stage and a surface of a quartz plate) to be pressurized, bringing two metal layers into contact with each other without space therebetween requires filling of space by compressing and plastically deforming these two metal layers (in particular, a softer one of the metal layers). This requires application of a high pressure. Hence, filling space between the two metal layers over the entire areas of the wafers requires a large load. For example, a load from 3 to 6 tons is required for a wafer having a diameter of 200 mm. This has brought about the necessity to design the quartz plate to be thick so as to achieve strength enough to withstand pressure applied during joining (specifically, so as not to be broken during application of the pressure).

The present invention is intended to reduce pressure required for bringing two types of metals into contact with each other without space therebetween in a joining technique using laser light.

Solution to Problem

A joining apparatus according to the present invention is an apparatus that connects a first metal layer and a second metal layer formed on respective joint surfaces of two joining targets to each other through joining using laser light, thereby joining the joint surfaces of the two joining targets to each other. The joining apparatus comprises a table, a pressurizing mechanism, a laser light source that emits the laser light, and a controller. The table has permeability to the laser light. The two joining targets are to be placed on the table while the first metal layer and the second metal layer face each other. The pressurizing mechanism includes a diaphragm, and is capable of applying pressure to a back surface of the joining target using the diaphragm from an opposite side to the table. The controller brings the first metal layer and the second metal layer into contact with each other by applying pressure to the back surface of the joining target using the diaphragm while the two joining targets are placed on the table, and while maintaining the resultant state, applies the laser light to a place of contact between the first metal layer and the second metal layer through the table.

In the above-described joining apparatus, the diaphragm can be changed flexibly in conformity with the shape of the back surface of the joining target when pressure is applied to this back surface. This allows the diaphragm to tightly contact the back surface of the joining target and apply the pressure uniformly to the back surface, making it possible to cause deformation of the joining target using the applied pressure. The diaphragm follows change in the shape of the back surface resulting from the deformation of the joining target, so that the uniform pressure can be applied continuously to the back surface. In this way, the uniform pressure is applied to the back surface of the joining target using the diaphragm. Thus, even if the applied pressure is relatively low, it is still possible to deform the joining target in such a manner as to eliminate space between the first metal layer and the second metal layer and to maintain the resultant state. As a result, even under the relatively low pressure, it is still possible to bring the first metal layer and the second metal layer into contact with each other in a wide range without space therebetween. By applying the laser light in the resultant state to a place of contact between the first metal layer and the second metal layer, it becomes possible to connect the first metal layer and the second metal layer to each other in a wide range through joining using the laser light.

Advantageous Effects of Invention

According to the present invention, it is possible to reduce pressure required for bringing two types of metals into contact with each other without space therebetween in a joining technique using laser light.

DESCRIPTION OF EMBODIMENTS

The following describes the present invention in detail applied to a joining technique using laser light, particularly to a joining technique utilizing eutectic reaction.

Figure 1:
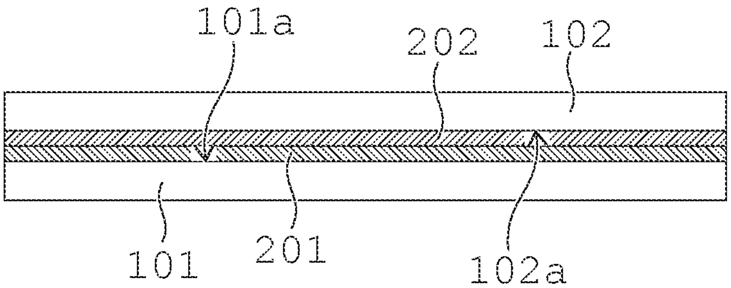
FIG. 1 is a conceptual view illustrating two joining targets to be joined to each other by a joining apparatus.

FIG. 1 is a conceptual view illustrating two joining targets 101 and 102 to be joined to each other by a joining apparatus described below. The joining targets 101 and 102 are semiconductor wafers, for example, and have respective joint surfaces 101*a* and 102*a* where a first metal layer 201 and a second metal layer 202 are formed respectively. Here, the first metal layer 201 is a layer containing one of two types of metals to generate eutectic reaction as a major constituent, and the second metal layer 202 is a layer containing the other metal as a major constituent. Examples of a combination of the two types of metals include a combination of aluminum (Al) and germanium (Ge), a combination of copper (Cu) and tin (Sn), a combination of silver (Ag) and tin (Sn), and a combination of indium (In) and tin (Sn). While these layers are not particularly limited, they are formed by vapor deposition or application of the metals to the joint surfaces 101*a* and 102*a*.

Figure 2A:
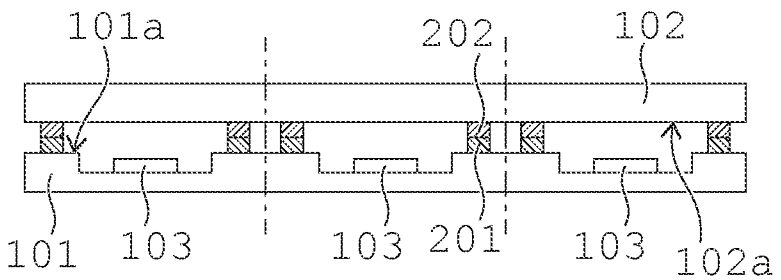
FIG. 2A is a sectional view showing an example of a case with a patterned first metal layer and a patterned second metal layer.
Figure 2B:
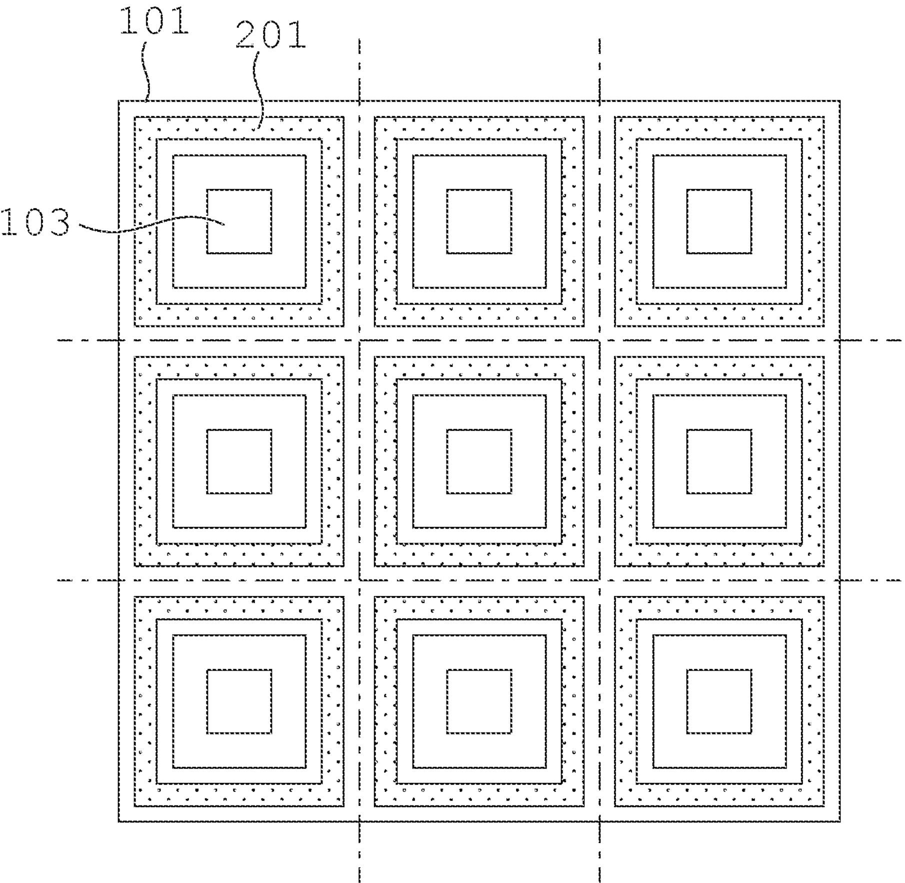
FIG. 2B is a plan view showing this example.

FIG. 1 schematically shows a case where the first metal layer 201 is formed on the entire area of the joint surface 101*a* and the second metal layer 202 is formed on the entire area of the joint surface 102*a*. In an actual process of manufacturing a semiconductor device (such as a MEMS), however, the first metal layer 201 and the second metal layer 202 are patterned into various shapes in conformity with the shape or purpose of use of a device. FIGS. 2A and 2B are a sectional view and a plan view respectively showing exemplary pattern shapes of the first metal layer 201 and the second metal layer 202. FIG. 2B shows only the first metal layer 201 in a plan view. In this example, in order to allow one sensor 103 to be sealed in each device, the first metal layer 201 and the second metal layer 202 are each formed into a quadrangular frame-like shape surrounding one sensor 103. The pattern shape of each of the first metal layer 201 and the second metal layer 202 is not limited to a quadrangular frame-like shape but is appropriately changeable in conformity with the shape or purpose of use of a device, for example.

The joining apparatus described below connects the first metal layer 201 and the second metal layer 202 to each other by utilizing eutectic reaction generated by heating a place of contact between these metal layers with laser light (namely, eutectic bonding using laser light), thereby joining the respective joint surfaces 101*a* and 102*a* of the two joining targets 101 and 102 to each other.

[1] First Embodiment

[1-1] Configuration of Joining Device

Figure 3:
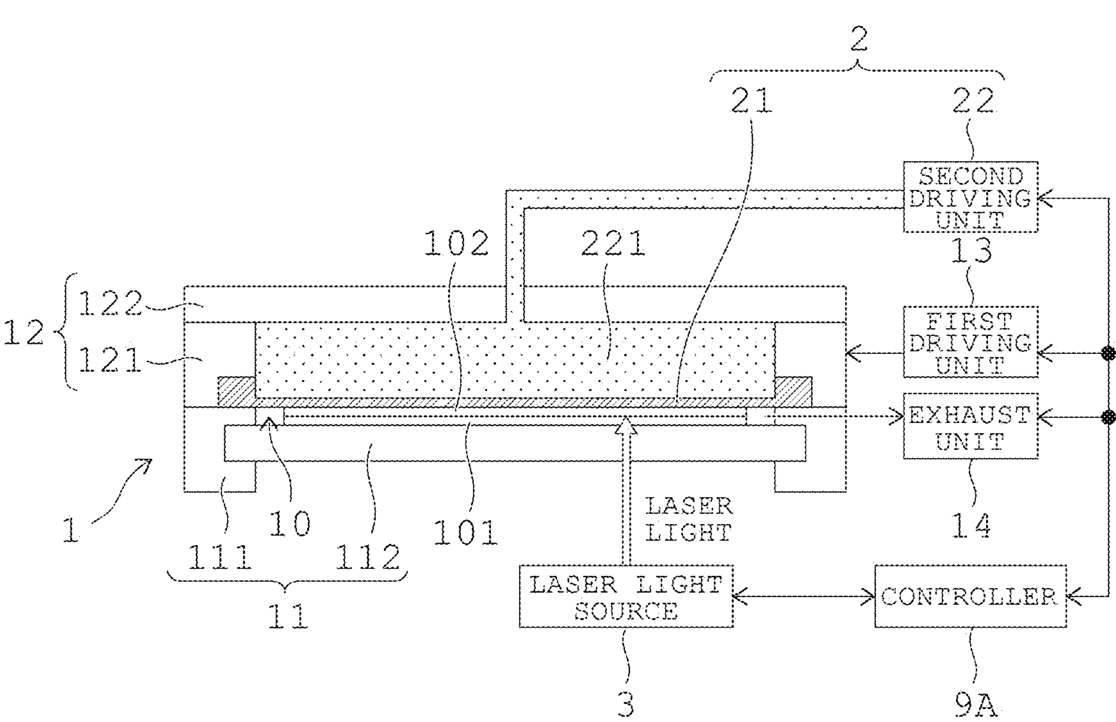
FIG. 3 is a conceptual view showing a joining apparatus according to a first embodiment.

FIG. 3 is a conceptual view showing a joining apparatus according to a first embodiment, As shown in FIG. 3, the joining apparatus of the present embodiment includes a chamber mechanism 1, a first pressurizing mechanism 2, a laser light source 3, and a controller 9A, The configuration of each part will be described below in detail.

<Chamber Mechanism 1>

The chamber mechanism 1 includes a first chamber structure unit 11, a second chamber structure unit 12, a first driving unit 13, and an exhaust unit 14.

The first chamber structure unit 11 and the second chamber structure unit 12 are units to form enclosed space (hereinafter called a "chamber 10") for implementation of a joining process. The first chamber structure unit 11 and the second chamber structure unit 12 are configured to realize formation and opening of the chamber 10 selectively by getting closer to and away from each other in a vertical direction.

In the present embodiment, the first chamber structure unit 11 is composed of a first cylindrical part 111 arranged with a center axis thereof extending in a direction conforming to the vertical direction, and a table 112 supported inside the first cylindrical part 111 horizontally without space between the table 112 and the first cylindrical part 111. Here, the table 112 is a table having permeability to laser light, and is a part on which the two joining targets 101 and 102 are to be placed while the first metal layer 201 and the second metal layer 202 face each other (see FIGS. 1 and 2A). As an example, the table 112 is a table made of quartz. The second chamber structure unit 12 is composed of a second cylindrical part 121 arranged over the first cylindrical part 111 and coaxially with the first cylindrical part 111, and a top plate 122 closing an upper end of the second cylindrical part 121. An upper end of the first cylindrical part 111 and a lower end of the second cylindrical part 121 contact each other without space therebetween, thereby forming the chamber 10 between the table 112 and the top plate 122.

The first driving unit 13 is a unit that moves at least one of the first chamber structure unit 11 and the second chamber structure unit 12 in the vertical direction, thereby causing these structure units to get closer to and away from each other.

The exhaust unit 14 is a unit that reduces an air pressure in the chamber 10 until a vacuum state is formed in the chamber 10 (more specifically, space as part of the chamber 10 and defined between a diaphragm 21 described later and the table 112). For example, an air pressure adjuster such as a vacuum pump is used as the exhaust unit 14. The chamber mechanism 1 may further include a gas supplier that supplies processing gas (such as argon (Ar) gas) into the chamber 10.

<First Pressurizing Mechanism 2>

The first pressurizing mechanism 2 is a mechanism including the diaphragm 21, and capable of applying pressure to a back surface 102*b* of the joining target 102 using the diaphragm 21 from an opposite side to the table 112, In the present embodiment, the first pressurizing mechanism 2 is composed of the diaphragm 21, and a second driving unit 22 that actuates the diaphragm 21, Particulars thereof will be described below.

The diaphragm 21 is supported inside the second cylindrical part 121 without space between the diaphragm 21 and the second cylindrical part 121 in such a manner that, when the chamber 10 is formed, the diaphragm 21 contacts the back surface 102*b* of the upper joining target 102 of the two joining targets 101 and 102 placed on the table 112.

The second driving unit 22 transmits pressure to the diaphragm 21 using a pressure medium 221, thereby actuating the diaphragm 21, More specifically, the pressure medium 221 is packed in between the diaphragm 21 and the top plate 122 inside the second chamber structure unit 12, The second driving unit 22 changes pressure to be applied to the pressure medium 221, thereby actuating the diaphragm 21 through the pressure medium 221, Here, the pressure medium 221 may be liquid or gas.

<Laser Light Source 3>

The laser light source 3 is a unit that emits laser light. In the present embodiment, the laser light source 3 is arranged below the table 112, and capable of performing a scan with laser light within a horizontal plane along the pattern shapes of the first metal layer 201 and the second metal layer 202 while applying the laser light toward the joining targets 101 and 102 on the table 112. The laser light source 3 is capable of focusing the laser light on a place of contact between the first metal layer 201 and the second metal layer 202.

<Controller 9A>

The controller 9A is composed of a processor such as a central processing unit (CPU) or a microcomputer, and controls various operation units (including the chamber mechanism 1, the first pressurizing mechanism 2, and the laser light source 3) of the joining apparatus, Particulars thereof will be described below.

During implementation of the joining process, while the two joining targets 101 and 102 are placed on the table 112, the controller 9A locates the first chamber structure unit 11 and the second chamber structure unit 12 adjacent to each other and unites the first chamber structure unit 11 and the second chamber structure unit 12, thereby forming the chamber 10. Then, the controller 9A controls the exhaust unit 14 to reduce an air pressure in the chamber 10 until a vacuum state is formed in the chamber 10 (more specifically, space as part of the chamber 10 and defined between the diaphragm 21 and the table 112). Furthermore, the controller 9A supplies processing gas (such as argon (Ar) gas) into the chamber 10 according to demand.

The controller 9A thereafter controls the first pressurizing mechanism 2 to apply pressure to the back surface 102*b* of the joining target 102 using the diaphragm 21.

The diaphragm 21 can be changed flexibly in conformity with the shape of the back surface 102*b* of the joining target 102 when the pressure is applied to the back surface 102*b*. This allows the diaphragm 21 to tightly contact the back surface 102*b* of the joining target 102 and apply the pressure uniformly to the back surface 102*b*, making it possible to cause deformation (including elastic deformation) of the joining target 102 using the applied pressure. The diaphragm 21 follows change in the shape of the back surface 102*b* resulting from the deformation of the joining target 102, so that the uniform pressure can be applied continuously to the back surface 102*b*. In this way, the uniform pressure is applied to the back surface 102*b* of the joining target 102 using the diaphragm 21. Thus, even if the applied pressure is relatively low, it is still possible to deform the joining target 102 in such a manner as to eliminate space between the first metal layer 201 and the second metal layer 202 and to maintain the resultant state. As a result, even under the relatively low pressure, it is still possible to bring the first metal layer 201 and the second metal layer 202 into contact with each other in a wide range without space therebetween. Specifically, through the pressurization using the diaphragm 21, it is possible to reduce pressure required for bringing the first metal layer 201 and the second metal layer 202 into contact with each other without space therebetween. For example, if the joining targets 101 and 102 are wafers having a diameter of 200 mm, applying pressure with pressing planes to the joining targets 101 and 102 sandwiched between the planes like in Patent Literature 2 requires a load from 3 to 6 tons. By contrast, the pressurization using the diaphragm 21 achieves reduction to a load of equal to or less than 2 tons.

After the first metal layer 201 and the second metal layer 202 are brought into contact with each other without space therebetween through the pressurization to the back surface 102*b* of the joining target 102 using the diaphragm 21 in this way, the controller 9A controls the laser light source 3 while maintaining the resultant state, thereby applying laser light to a place of contact between the first metal layer 201 and the second metal layer 202 through the table 112. The controller 9A performs a scan with the laser light within a horizontal plane along the pattern shapes of the first metal layer 201 and the second metal layer 202. By doing so, it becomes possible to connect the first metal layer 201 and the second metal layer 202 to each other over the entire areas of the joining targets 101 and 102 through eutectic bonding. In this way, the respective joint surfaces 101*a* and 102*a* of the two joining targets 101 and 102 are joined to each other.

As described above, the pressurization using the diaphragm 21 can reduce a required pressure. This further achieves reduction in strength required for the table 112 (strength enough to withstand pressure applied during joining). As a result, it becomes possible to form the table 112 into a relatively small thickness.

[1-2] Modification

Figure 4:
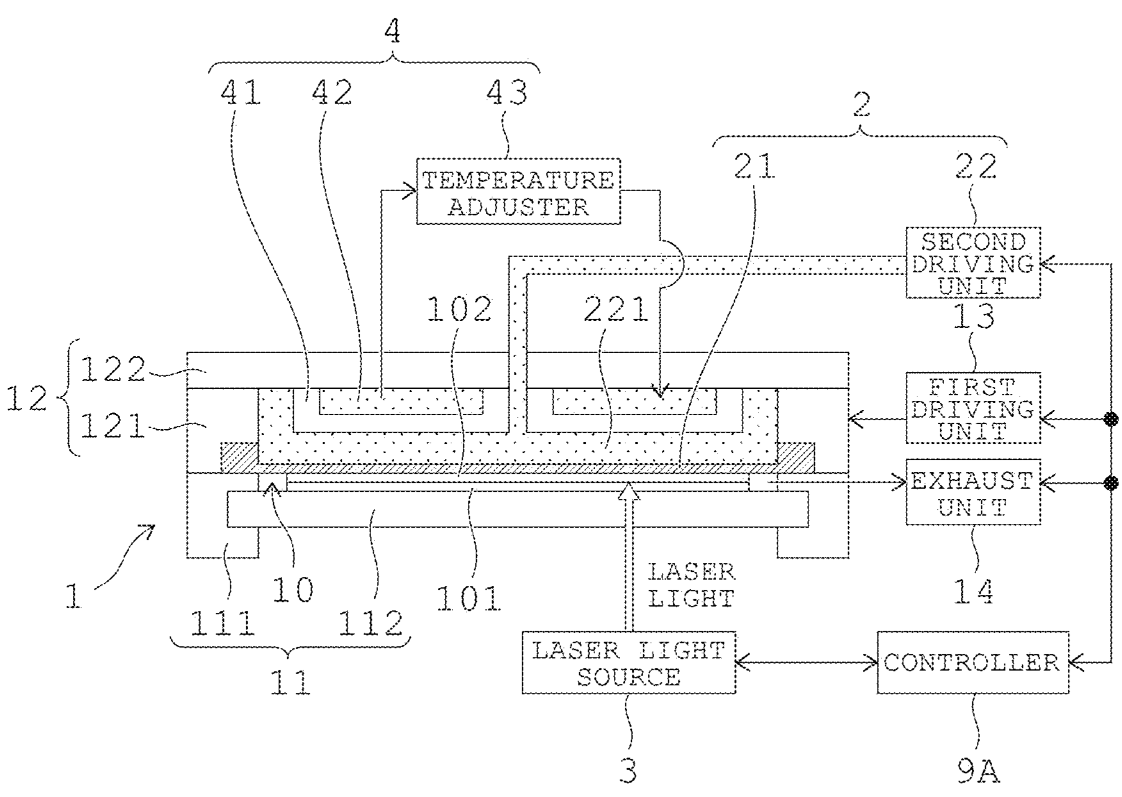
FIG. 4 is a conceptual view showing a modification of the joining apparatus according to the first embodiment.

FIG. 4 is a conceptual view showing a modification of the joining apparatus according to the first embodiment. As shown in FIG. 4, the joining apparatus may further include a heater 4 that heats the joining targets 101 and 102. In the present embodiment, the heater 4 is a heat exchanger composed of a heat exchange part 41 made of a material having high heat conductivity (such as aluminum (Al)), a heating medium 42 that applies heat to the heat exchange part 41, and a temperature adjuster 43 that adjust the temperature of the heating medium 42. The heater 4 is arranged on an opposite side to the table 112 with respect to the diaphragm 21. More specifically, the heat exchange part 41 is mounted on an inner surface of the top plate 122, and the heating medium 42 is circulated between the heat exchange part 41 and the temperature adjuster 43 through a hole formed at the top plate 122. In this configuration, the pressure medium 221 is interposed between the heat exchange part 41 and the diaphragm 21 and heat is exchanged between the heat exchange part 41 and the diaphragm 21 through the pressure medium 221. Specifically, heat of the heater 4 is transmitted through the pressure medium 221 to the diaphragm 21.

During application of laser light to a place of contact between the first metal layer 201 and the second metal layer 202, the controller 9A controls the temperature adjuster 43 to heat the joining targets 101 and 102 through the heat exchange part 41. At this time, the controller 9A heats the joining targets 101 and 102 at a temperature lower than a temperature required for eutectic bonding (eutectic temperature). By doing so, it becomes possible to reduce a temperature width to be increased by heating with the laser light by an amount corresponding to the temperature increase at the place of contact between the first metal layer 201 and the second metal layer 202 achieved by the heating using the heater 4. As an example, if a combination of two types of metals is a combination of aluminum (Al) and germanium (Ge), a temperature required for eutectic bonding (eutectic temperature) is about 450° C. In this case, by heating the joining targets 101 and 102 using the heater 4 to about 90° C., for example, it becomes possible to reduce a temperature width to be increased by heating with the laser light to about 360° C. (=450° C.−90° C.). Specifically, the heater 4 assists in the heating of the contact place with the laser light. In this way, it becomes possible to encourage energy saving through restriction of laser output or increase a processing speed during the joining process, for example.

Heating by the heater 4 can also be used in an annealing process that alleviates distortions of the joining targets 101 and 102 caused during joining (more specifically, deformation of the joining target 102 caused by pressurization using the diaphragm 21 and left as it is by the joining).

In the above-described configuration with the heater 4, liquid is preferable to gas for the pressure medium 221. The reason for this is that, as liquid has higher heat conductivity than gas, heat is exchanged more efficiently between the heat exchange part 41 and the diaphragm 21 through the pressure medium 221, thereby facilitating transmission of heat of the heater 4 to the diaphragm 21.

Preferably, the heating medium 42 is constant-temperature water adjusted to a predetermined temperature (90° C., for example) by the temperature adjuster 43. The reason for this is that, as using the constant-temperature water allows a temperature at the heat exchange part 41 to be maintained constantly, it is possible not only to assist in heating of the joining targets 101 and 102 but also to cool the joining targets 101 and 102 if temperatures at the joining targets 101 and 102 are increased excessively by heating with laser light (prevention of overheating).

[2] Second Embodiment

The joining apparatus described in the first embodiment is an apparatus not including either chuck mechanisms that hold the joining targets 101 and 102 individually or an alignment mechanism that adjusts the positions of the joining targets 101 and 102 relative to each other. For this reason, the two joining targets 101 and 102 are adjusted in positions relative to each other and overlaid on each other by a different apparatus before joining at the joining apparatus, and then carried and placed onto the table 112. However, carrying the two joining targets 101 and 102 in a state of being overlaid on each other simply causes a risk of misalignment between the adjusted positions of the joining targets 101 and 102 relative to each other due to vibration occurring during the carrying, for example.

Then, a different joining apparatus will be described in the present embodiment that performs both adjustment of the positions of the two joining targets 101 and 102 relative to each other and preliminary joining intended to maintain the adjusted relative positions before implementation of joining at the joining apparatus (main joining) described in the first embodiment. The preliminary joining mentioned herein is performed by connecting the first metal layer 201 and the second metal layer 202 to each other at several places by utilizing eutectic bonding using laser light.

Figure 5:
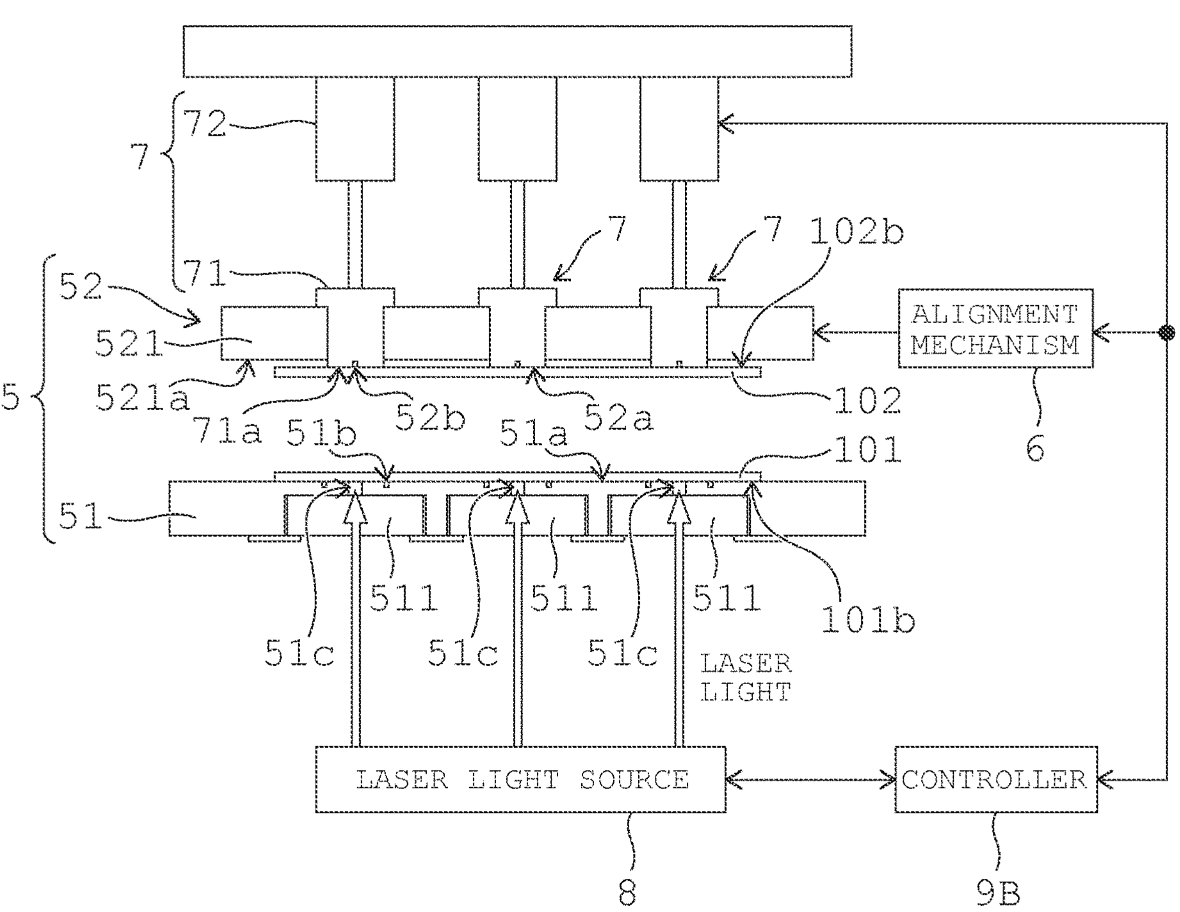
FIG. 5 is a conceptual view showing a joining apparatus according to a second embodiment.

FIG. 5 is a conceptual view showing the joining apparatus according to a second embodiment, As shown in FIG. 5, the joining apparatus of the present embodiment includes a chuck mechanism 5, an alignment mechanism 6, a second pressurizing mechanism 7, a laser light source 8, and a controller 9B, The configuration of each part will be described below in detail.

<Chuck Mechanism 5 and Second Pressurizing Mechanism 7>

The chuck mechanism 5 includes a first chuck unit 51 and a second chuck unit 52.

The first chuck unit 51 is a table including a suction surface 51*a* for suction of a back surface 101*b* of the joining target 101 that is one of the two joining targets 101 and 102. The suction surface 51*a* is provided with a suction groove 51*b* formed in an entire area of the suction surface 51*a*. The joining target 101 is placed on the suction surface 51*a* while the back surface 101*b* is pointed downward and in this state, an air pressure in the suction groove 51*b* is reduced through vacuum suction, for example. By doing so, it becomes possible to suck the back surface 101*b* of the joining target 101 to the suction surface 51*a*.

The suction surface 51*a* of the first chuck unit 51 is further provided with through holes 51*c* formed at several places (five places, for example, and three of them are shown in FIG. 5) for passage of laser light. A quartz block 511 that compensates for spherical aberration of laser light is buried in each of the through holes 51*c*.

The second chuck unit 52 includes a suction surface 52*a* for suction of the back surface 102*b* of the other joining target 102 of the two joining targets 101 and 102, and is arranged while the suction surface 52*a* faces the suction surface 51*a* of the first chuck unit 51, In the present embodiment, the second chuck unit 52 includes a base body 521 as a foundation thereof, The base body 521 has a lower surface 521*a* where each of parts facing the through holes 51*c* is composed of a pressure-contact surface 71*a* belonging to the second pressurizing mechanism 7, The pressure-contact surface 71*a* is provided with a suction groove 52*b*, Particulars thereof will be described below.

The second pressurizing mechanism 7 includes a pressure-contact unit 71 with the pressure-contact surface 71*a*, and a third driving unit 72, The pressure-contact unit 71 is provided at each of places of the second chuck unit 52 facing the through holes 51*c*, The pressure-contact unit 71 is provided movably in a direction perpendicular to the lower surface 521*a* of the base body 521 (here, vertical direction), and is movable to a protruding position where the pressure-contact surface 71*a* protrudes downward from the lower surface 521*a* of the base body 521, The third driving unit 72 is an air cylinder, for example, and allows pressurization to a target brought into contact with the pressure-contact surface 71*a*, In the present embodiment, the third driving unit 72 biases the pressure-contact unit 71 downward to move the pressure-contact unit 71 to the protruding position.

The pressure-contact surface 71*a* is brought into contact with the back surface 102*b* of the joining target 102 and in the contacting state, an air pressure in the suction groove 52*b* is reduced through vacuum suction, for example. By doing so, the back surface 102*b* of the joining target 102 is sucked to the pressure-contact surface 71*a*. In this way, in the present embodiment, the pressure-contact surface 71*a* with the suction groove 52*b* forms the suction surface 52*a* of the second chuck unit 52.

More specifically, the two joining targets 101 and 102 are held on (sucked to) the first chuck unit 51 and the second chuck unit 52 respectively as follows. Before the joining target 101 is sucked to the first chuck unit 51, the joining target 102 is first placed on the first chuck unit 51 while the back surface 102*b* of the joining target 102 is pointed upward. Then, at least one of the first chuck unit 51 and the second chuck unit 52 is moved in the vertical direction (for example, the second chuck unit 52 is moved down), thereby bringing the pressure-contact surface 71*a* (suction surface 52*a*) into contact with the back surface 102*b* of the joining target 102. In the contacting state, an air pressure in the suction groove 52*b* is reduced through vacuum suction, for example. By doing so, the back surface 102*b* of the joining target 102 is sucked to the pressure-contact surface 71*a*. The first chuck unit 51 and the second chuck unit 52 are thereafter separated from each other (for example, the second chuck unit 52 is moved up), and then the joining target 101 is sucked to the first chuck unit 51.

After the two joining targets 101 and 102 are held on (sucked to) the first chuck unit 51 and the second chuck unit 52 respectively, the positions of the two joining targets 101 and 102 relative to each other are adjusted by the alignment mechanism 6 descried below, Next, at least one of the first chuck unit 51 and the second chuck unit 52 is moved in the vertical direction (for example, the second chuck unit 52 is moved down), thereby bringing the two joining targets 101 and 102 (more specifically, the first metal layer 201 and the second metal layer 202) into contact with each other, Then, the first chuck unit 51 and the second chuck unit 52 are brought closer to each other against the biasing force of the third driving unit 72 (for example, the second chuck unit 52 is moved down further), thereby applying pressure to the back surface 102*b* of the joining target 102 through the pressure-contact unit 71.

As described above, pressure can be applied by the second pressurizing mechanism 7 to local parts being parts of the back surface 102*b* of the joining target 102 sucked to the second chuck unit 52 and overlapping the through holes 51*c*, As a result, the first metal layer 201 and the second metal layer 202 can contact each other without space therebetween at this local part.

<Alignment Mechanism 6>

The alignment mechanism 6 is a mechanism that adjusts the positions of the two joining targets 101 and 102 relative to each other in such a manner as to locate the first metal layer 201 and the second metal layer 202 in a facing relationship while the two joining targets 101 and 102 are held on (sucked to) the first chuck unit 51 and the second chuck unit 52 respectively. More specifically, the alignment mechanism 6 adjusts the position of at least one of the first chuck unit 51 and the second chuck unit 52 in a horizontal plane, thereby allowing the positions of the two joining targets 101 and 102 held on (sucked to) the first chuck unit 51 and the second chuck unit 52 respectively to be adjusted relative to each other.

<Laser Light Source 8>

The laser light source 8 is a unit that emits laser light. In the present embodiment, the laser light source 8 is arranged below the first chuck unit 51, and applies laser light toward the joining targets 101 and 102 on the first chuck unit 51 through the through hole 51*c*. The laser light source 8 may be configured to pass rays of the laser light simultaneously through a plurality of the through holes 51*c* formed at the first chuck unit 51, or may be configured to be movable in a horizontal plane and to pass rays of the laser light one by one sequentially through the through holes 51*c*. Furthermore, the laser light source 3 is capable of focusing the laser light on a place of contact between the first metal layer 201 and the second metal layer 202.

<Controller 9B>

The controller 9B is composed of a processor such as a central processing unit (CPU) or a microcomputer, and controls various operation units (including the chuck mechanism 5, the alignment mechanism 6, the second pressurizing mechanism 7, and the laser light source 8) of the joining apparatus, Particulars thereof will be described below.

During implementation of the preliminary joining process, while the two joining targets 101 and 102 are held on (sucked to) the first chuck unit 51 and the second chuck unit 52 respectively, the controller 9B controls the alignment mechanism 6 to adjust the positions of the two joining targets 101 and 102 relative to each other in such a manner as to locate the first metal layer 201 and the second metal layer 202 in a facing relationship, After the relative positions are adjusted by the alignment mechanism 6, the controller 9B moves at least one of the first chuck unit 51 and the second chuck unit 52 in the vertical direction while maintaining the adjusted relative positions, thereby bringing the two joining targets 101 and 102 closer to each other held on (sucked to) the first chuck unit 51 and the second chuck unit 52 respectively to bring the first metal layer 201 and the second metal layer 202 into contact with each other, By doing so, pressure is applied through the pressure-contact unit 71 to local parts being parts of the back surface 102*b* of the joining target 102 and overlapping the through holes 51*c*, As a result, the first metal layer 201 and the second metal layer 202 contact each other without space therebetween at these local parts, At this time, the controller 9B may adjust the pressure to be applied to the local parts by controlling the second pressurizing mechanism 7 (more specifically, the third driving unit 72) while the first metal layer 201 and the second metal layer 20 contact each other.

After the first metal layer 201 and the second metal layer 202 are brought into contact with each other without space therebetween at the local parts in this way, the controller 9B controls the laser light source 8 while maintaining the resultant state, thereby applying laser light to a place of contact between the first metal layer 201 and the second metal layer 202 through the through holes 51*c* corresponding to the local parts. This allows the first metal layer 201 and the second metal layer 202 to be connected to each other through eutectic bonding at several places of the joining targets 101 and 102. In this way, the respective joint surfaces 101*a* and 102*a* of the two joining targets 101 and 102 are joined to each other.

As described above, by performing the preliminary joining on the two joining targets 101 and 102 before implementation of the joining (main joining) at the joining apparatus described in the first embodiment, the positions of the two joining targets 101 and 102 relative to each other adjusted by the alignment mechanism 6 are fixed. As a result, even on the occurrence of vibration during carrying, for example, misalignment is still unlikely to occur between the positions of the two joining targets 101 and 102 relative to each other.

[3] Third Embodiment

In the above-described joining apparatus according to the first embodiment, the table 112 and the diaphragm 21 may have respective suction surfaces to which the two joining targets 101 and 102 are to be sucked individually. Such a joining apparatus may further include an alignment mechanism that adjusts the positions of the two joining targets 101 and 102 relative to each other held on (sucked to) the table 112 and the diaphragm 21 respectively. This alignment mechanism adjusts the position of at least one of the first chamber structure unit 11 and the second chamber structure unit 12 in a horizontal plane, thereby adjusting the positions of the two joining targets 101 and 102 relative to each other sucked to the table 112 and the diaphragm 21 respectively.

In this case, while the two joining targets 101 and 102 are held on (sucked to) the table 112 and the diaphragm 21 respectively, the controller 9A controls the above-described alignment mechanism to adjust the positions of the two joining targets 101 and 102 relative to each other in such a manner as to locate the first metal layer 201 and the second metal layer 202 in a facing relationship. After the relative positions are adjusted by the alignment mechanism, while maintaining the adjusted relative positions, the controller 9A locates the first chamber structure unit 11 and the second chamber structure unit 12 adjacent to each other and unites the first chamber structure unit 11 and the second chamber structure unit 12, thereby forming the chamber 10. By doing so, the two joining targets 101 and 102 held on (sucked to) the table 112 and the diaphragm 21 respectively are brought closer to each other, so that the first metal layer 201 and the second metal layer 202 can be brought into contact with (including adjacency to) each other.

Next, while the contact (including adjacency) is formed between the first metal layer 201 and the second metal layer 202, the controller 9A controls the first pressurizing mechanism 2 to apply pressure to the back surface 102*b* of the joining target 102 using the diaphragm 21, By doing so, the first metal layer 201 and the second metal layer 202 are brought into contact with each other without space therebetween, Then, the controller 9A controls the laser light source 3 while maintaining the resultant state, thereby applying laser light to a place of contact between the first metal layer 201 and the second metal layer 202 through the table 112, The controller 9A performs a scan with the laser light within a horizontal plane along the pattern shapes of the first metal layer 201 and the second metal layer 202.

The joining apparatus of the present embodiment does not require the preliminary joining described in the second embodiment, thereby achieving simplification of a system as a whole to be used for the joining.

The above explanations of the embodiments are nothing more than illustrative in any respect, nor should be thought of as restrictive. The scope of the present invention is indicated by claims rather than the above embodiments. Furthermore, it is intended that all changes that are equivalent to a claim in the sense and realm of the doctrine of equivalence be included within the scope of the present invention.

For example, the above-described joining apparatuses are applicable not only to joining utilizing eutectic reaction (eutectic bonding) but also to various joining types requiring local heating such as solder joining and weld joining.

REFERENCE SIGNS LIST

1 Chamber mechanism
2 First Pressurizing mechanism
3 Laser light source
4 Heater
5 Chuck mechanism
6 Alignment mechanism
7 Second Pressurizing mechanism
8 Laser light source
9A, 9B Controller
10 Chamber
11 First chamber structure unit
12 Second chamber structure unit
13 First Driving unit
14 Exhaust unit
21 Diaphragm
22 Second Driving unit
41 Heat exchange part
42 Heating medium
43 Temperature adjuster
51 First chuck unit
51*a* Suction surface
51*b* Suction groove
51*c* Through hole
52 Second chuck unit
52*a* Suction surface
52*b* Suction groove
71 Pressure-contact unit
71*a* Pressure-contact surface
72 Third Driving unit
101, 102 Joining target
101*a*, 102*a* Joint surface
101*b*, 102*b* Back surface
103 Sensor
111 First cylindrical part
112 Table
121 Second cylindrical part
122 Top plate
201 First metal layer
202 Second metal layer
221 Pressure medium
511 Quartz block
521 Base body
521*a* Lower surface

The invention claimed is:

1. A joining apparatus that connects a first metal layer and a second metal layer formed on respective joint surfaces of two joining targets to each other through joining using laser light, thereby joining the joint surfaces of the two joining targets to each other, the joining apparatus comprising:

a table having permeability to the laser light and on which the two joining targets are to be placed while the first metal layer and the second metal layer face each other;

a diaphragm comprising a flexible membrane configured to deform in conformity with a back surface of one of the two joining targets and to apply pressure uniformly thereto, the diaphragm arranged on an opposite side to the table with respect to the two joining targets;

a laser light source that emits the laser light; and a controller that brings the first metal layer and the second metal layer into contact with each other by applying pressure to the back surface of the one of the two joining targets using the diaphragm while the two joining targets are placed on the table, and while maintaining the resultant state, applies the laser light to a place of contact between the first metal layer and the second metal layer through the table.

2. The joining apparatus according to claim 1, further comprising:

a heater that heats the joining targets, wherein during application of the laser light to the contact place, the controller causes the heater to heat the joining targets at a temperature lower than a temperature required for the joining using the laser light.

3. The joining apparatus according to claim 2, wherein a pressure medium through which pressure is transmitted to the diaphragm is liquid, and the heater is arranged on an opposite side to the table with respect to the diaphragm and the pressure medium is interposed between the heater and the diaphragm.

4. The joining apparatus according to claim 2, wherein the heater is a heat exchanger that uses constant-temperature water adjusted to a predetermined temperature as a heating medium.

5. A joining apparatus that connects a first metal layer and a second metal layer formed on respective joint surfaces of two joining targets to each other through joining using laser light, thereby joining the joint surfaces of the two joining targets to each other, the joining apparatus comprising:

a first chuck unit including a suction surface to which a back surface of one of the two joining targets is to be sucked, and a plurality of through holes formed at the suction surface and through each of which the laser light is to pass;

a second chuck unit including a suction surface to which a back surface of the other of the two joining targets is to be sucked;

an alignment mechanism that adjusts the positions of the two joining targets relative to each other in such a manner as to locate the first metal layer and the second metal layer in a facing relationship while the two joining targets are sucked to the first chuck unit and the second chuck unit;

a plurality of pressure-contact units each having a pressure-contact surface and being movable to a protruding position relative to the second chuck unit to locally contact and apply pressure to the back surface of the other of the two joining targets, the plurality of pressure contact units provided at places of the second chuck unit facing the through holes;

a laser light source that emits the laser light; and a controller, after adjustment of the relative positions by the alignment mechanism, the controller causing the pressure-contact units to apply pressure to local parts overlapping the through holes respectively on the back surface of the other of the two joining targets while the first metal layer and the second metal layer contact each other, and while maintaining the resultant state, applying the laser light to a place of contact between the first metal layer and the second metal layer through the through hole corresponding to each of the local parts.

6. The joining apparatus according to claim 5, wherein the joining apparatus adjusts the positions of the two joining targets relative to each other and performs preliminary joining intended to maintain the adjusted relative positions before the joining at the joining apparatus according to claim 1.

7. A joining apparatus that connects a first metal layer and a second metal layer formed on respective joint surfaces of two joining targets to each other through joining using laser light, thereby joining the joint surfaces of the two joining targets to each other, the joining apparatus comprising:

a table having permeability to the laser light and including a suction surface to which a back surface of one of the two joining targets is to be sucked;

a diaphragm comprising a flexible membrane configured to deform in conformity with a back surface of the other of the two joining targets and to apply pressure uniformly thereto, the diaphragm having a suction surface to which a back surface of the other of the two joining targets is to be sucked;

an alignment mechanism that adjusts the positions of the two joining targets relative to each other in such a manner as to locate the first metal layer and the second metal layer in a facing relationship while the two joining targets are sucked to the table and the diaphragm;

a laser light source that emits the laser light; and a controller, after adjustment of the relative positions by the alignment mechanism, the controller applying pressure to the back surface of the other of the two joining targets using the diaphragm while the first metal layer and the second metal layer contact each other, and while maintaining the resultant state, applying the laser light to a place of contact between the first metal layer and the second metal layer through the table.

* * * * *